US012793047B2

(12) United States Patent
Lamesh

(10) Patent No.: US 12,793,047 B2
(45) Date of Patent: Nov. 10, 2026

(54) CRYPTOCURRENCY WALLET AND CRYPTOCURRENCY ACCOUNT MANAGEMENT

(71) Applicant: Galaxy Digital Trading LLC, New York, NY (US)

(72) Inventor: Lior Lamesh, Rishon-LeZion (IL)

(73) Assignee: Galaxy Digital Trading LLC, New York, NY (US)

( * ) Notice: Subject to any disclaimer, the term of this patent is extended or adjusted under 35 U.S.C. 154(b) by 0 days.

(21) Appl. No.: 16/966,933

(22) PCT Filed: Feb. 14, 2019

(86) PCT No.: PCT/IL2019/050181
§ 371 (c)(1),
(2) Date: Aug. 3, 2020

(87) PCT Pub. No.: WO2019/159172
PCT Pub. Date: Aug. 22, 2019

(65) Prior Publication Data

US 2021/0049591 A1 Feb. 18, 2021

Related U.S. Application Data

(60) Provisional application No. 62/630,923, filed on Feb. 15, 2018.

(51) Int. Cl.
*G06Q 20/36* (2012.01)
*G06Q 20/06* (2012.01)
(Continued)

(52) U.S. Cl.
CPC ..... *G06Q 20/3678* (2013.01); *G06Q 20/0655* (2013.01); *G06Q 20/3276* (2013.01);
(Continued)

(58) Field of Classification Search
None
See application file for complete search history.

(56) References Cited

U.S. PATENT DOCUMENTS

| | | | | |
|---|---|---|---|---|
| 6,431,439 | B1 * | 8/2002 | Suer ..................... | G06Q 20/389 235/382 |
| 9,225,695 | B1 | 12/2015 | Riera et al. | |

(Continued)

FOREIGN PATENT DOCUMENTS

| | | |
|---|---|---|
| CN | 107194676 | 9/2022 |
| JP | 2004-015507 | 1/2004 |

(Continued)

OTHER PUBLICATIONS

Antonopoulos, "Mastering Bitcoin," O'Reilly, all pages. (Year: 2014).*

(Continued)

*Primary Examiner* — Patrick McAtee
*Assistant Examiner* — Sima Asgari

(57) ABSTRACT

A digital wallet device for storing and securing cryptocurrency, the digital wallet device is electronically disconnected from other digital devices and comprising: a cryptocurrency integrated circuit (IC) that is isolated from any computer interface; a non-transitory computer readable storage medium mounted on the cryptocurrency IC and storing a private key of a cryptocurrency and a public key of the cryptocurrency; a man-machine interface (MMI) for receiving an input from a user; at least one processor mounted on the cryptocurrency IC for executing code to create a cryptocurrency action based on the input and to sign using the private key; and a unidirectional communication hardware for sending said transaction to a communication device for broadcasting said transaction via a network.

14 Claims, 10 Drawing Sheets

(51) Int. Cl.

| | |
|---|---|
| ***G06Q 20/32*** | (2012.01) |
| ***G06Q 20/38*** | (2012.01) |
| ***G06Q 20/40*** | (2012.01) |

(52) U.S. Cl.

CPC ..... *G06Q 20/3825* (2013.01); *G06Q 20/3827* (2013.01); *G06Q 20/3829* (2013.01); *G06Q 20/389* (2013.01); *G06Q 20/405* (2013.01); *G06Q 2220/00* (2013.01); *H04L 2209/56* (2013.01)

(56) References Cited

U.S. PATENT DOCUMENTS

| | | | | |
|---|---|---|---|---|
| 9,537,833 | B2 | 1/2017 | Zatko et al. | |
| 9,892,460 | B1 * | 2/2018 | Winklevoss | G06Q 40/04 |
| 10,269,009 | B1 * | 4/2019 | Winklevoss | G06Q 20/105 |
| 10,891,384 | B2 * | 1/2021 | Van De Ruit | G06Q 20/3825 |
| 11,222,353 | B1 * | 1/2022 | Chang | G06Q 20/322 |
| 2006/0041934 | A1 | 2/2006 | Hetzler | |
| 2006/0172266 | A1 * | 8/2006 | Rogers | G09B 21/00 434/112 |
| 2006/0228687 | A1 * | 10/2006 | Gomersall | G09B 7/04 434/323 |
| 2006/0242423 | A1 | 10/2006 | Kussmaul | |
| 2009/0152339 | A1 * | 6/2009 | Hawkins | G07C 13/00 235/51 |
| 2009/0167688 | A1 * | 7/2009 | Frank | G06F 3/0219 345/168 |
| 2010/0257353 | A1 | 10/2010 | Chong | |
| 2014/0351586 | A1 | 11/2014 | Hook et al. | |
| 2015/0264056 | A1 * | 9/2015 | Mevec | H04L 67/1097 726/3 |
| 2015/0295720 | A1 | 10/2015 | Buldas et al. | |
| 2015/0324789 | A1 * | 11/2015 | Dvorak | H04L 63/0861 705/67 |
| 2016/0149895 | A1 * | 5/2016 | Takai | G06F 21/45 726/7 |
| 2016/0253663 | A1 * | 9/2016 | Clark | G06Q 20/3678 705/75 |
| 2016/0335628 | A1 * | 11/2016 | Weigold | G06Q 20/065 |
| 2016/0342977 | A1 | 11/2016 | Lam | |
| 2017/0085555 | A1 | 3/2017 | Bisikalo et al. | |
| 2017/0109735 | A1 | 4/2017 | Sheng et al. | |
| 2017/0232300 | A1 | 8/2017 | Tran et al. | |
| 2018/0060860 | A1 * | 3/2018 | Tian | G06Q 20/065 |
| 2018/0262341 | A1 * | 9/2018 | Cheng | G06F 21/86 |
| 2018/0315027 | A1 * | 11/2018 | Kumar | G06Q 20/3278 |
| 2019/0052454 | A1 | 2/2019 | Wright et al. | |
| 2019/0080318 | A1 * | 3/2019 | Yuan | G06Q 20/36 |
| 2019/0318356 | A1 | 10/2019 | Martin et al. | |
| 2019/0356484 | A1 | 11/2019 | Ettensohn et al. | |
| 2020/0134606 | A1 | 4/2020 | Todd et al. | |

FOREIGN PATENT DOCUMENTS

| | | | | |
|---|---|---|---|---|
| JP | 2006-154997 | | 6/2006 | |
| KR | 10-2016-0024185 | | 3/2016 | |
| WO | WO-2015175854 | A2 * | 11/2015 | A61K 31/4523 |
| WO | WO 2018/020389 | | 2/2018 | |
| WO | WO 2019/159172 | | 8/2019 | |
| WO | WO 2020/115748 | | 6/2020 | |

OTHER PUBLICATIONS

International Search Report and the Written Opinion Dated May 27, 2021 From the International Searching Authority Re. Application No. PCT/IL2021/050237. (12 Pages).

Search Report and Written Opinion Dated Nov. 3, 2021 From the Intellectual Property Office of Singapore, IPOS Re. Application No. 11202007263V. (12 Pages).

International Preliminary Report on Patentability Dated Aug. 27, 2020 From the International Bureau of WIPO Re. Application No. PCT/IL2019/050181. (8 Pages).

International Search Report and the Written Opinion Dated Jun. 3, 2020 From the International Searching Authority Re. Application No. PCT/IL2020/050496. (29 Pages).

International Search Report and the Written Opinion Dated Jun. 19, 2019 From the International Searching Authority Re. Application No. PCT/IL2019/050181. (13 Pages).

International Search Report and the Written Opinion Dated Mar. 24, 2020 From the International Searching Authority Re. Application No. PCT/IL2019/051330. (14 Pages).

Invitation to Pay Additional Fees and Communication Relating to the Results of the Partial International Search Dated May 19, 2019 From the International Searching Authority Re. Application No. PCT/IL2019/050181. (4 Pages).

Nakamoto "Bitcoin: A Peer-to-Peer Electronic Cash System", Bitcoin White Paper, Retrieved From the Internet, Oct. 31, 2008.

Supplementary European Search Report and the European Search Opinion Dated Oct. 6, 2021 From the European Patent Office R. Application No. 19754487.7. (9 Pages).

Grounds of Reason of Rejection Dated May 11, 2023 From the Korean Intellectual Property Office Re. Application No. 10-2020-7026383 and its Translation Into English. (27 Pages).

Notice of Reason(s) for Rejection Dated May 9, 2023 From the Japan Patent Office Re. Application No. 2020-542978 and its Translation Into English. (12 Pages).

Office Action Dated Apr. 23, 2023 From the Israel Patent Office Re. Application No. 276714. (5 Pages).

Written Opinion Dated May 18, 2023 From the Intellectual Property Office of Singapore, IPOS Re. Application No. 11202007263V. (5 Pages).

Notification of Office Action Dated Nov. 12, 2023 From the National Intellectual Property Administration of the People's Republic of China Re. Application No. 201980025355.7 and its Translation Into English. (4 Pages).

Armory Technologies "Armory FAQ", Armory Technologies, XP055845074, p. 1-7, 2016.

Armory Technologies "Best Bitcoin Wallet Armory | Multi-Signature Cold Storage", Armory Technologies, XP055845060, p. 1-3, Feb. 3, 2016.

Bitcoin Stack Exchange "How to Sign a Transaction Using Only an Offline Computer?", Bitcoin Stack Exchange, XP055845053, p. 1-3, Feb. 8, 2014.

BitFinex "BitFinex Down Due to Bitcoin Security Breach—120k BTC Stolen", Hacker News, 14P., Aug. 2, 2016.

Coinkite "Announcing: Coldcard™. The World Needs an Open, Cheap & Ultrasecure Hardware Wallet!", Coinkite Blog, XP055845066, p. 1-5, Dec. 8, 2017.

Voegtlin "Multising Wallets", Electrum Read the Docs, XP055771867, p. 1-5, Mar. 29, 2017.

Examination Report Dated Aug. 18, 2023 From the Australian Government, IP Australia Re. Application No. 2019221323. (3 Pages).

Notice of Reason(s) for Rejection Dated Sep. 5, 2023 From the Japan Patent Office Re. Application No. 2020-542978 and its Translation Into English. (13 Pages).

Requisition by the Examiner Dated Sep. 19, 2023 From the Innovation, Science and Economic Development Canada, Canadian Intellectual Property Office Re. Application No. 3,089,206. (10 Pages).

Decision on Rejection Dated Jun. 1, 2024 From the State Intellectual Property Office of the People's Republic of China Re. Application No. 201980025355.7. (4 Pages).

English Summary and Translation Dated Jun. 19, 2024 of Decision on Rejection Dated Jun. 1, 2024 From the State Intellectual Property Office of the People's Republic of China Re. Application No. 201980025355.7. (3 Pages).

Office Action Dated Apr. 9, 2024 From the Israel Patent Office Re. Application No. 276714. (6 Pages).

Requisition by the Examiner Dated Aug. 16, 2024 From the Innovation, Science and Economic Development Canada, Canadian Intellectual Property Office Re. Application No. 3,089,206. (6 Pages).

Examination Report Dated Jun. 7, 2024 From the Australian Government, IP Australia Re. Application No. 2019221323. (3 Pages).

(56) References Cited

OTHER PUBLICATIONS

Notice of Eligibility for Grant and Examination Report Dated Apr. 8, 2025 From the Intellectual Property Office of Singapore, IPOS Re. Application No. 11202007263V. (4 Pages).

Grounds of Reason of Rejection Dated Aug. 1, 2025 From the Korean Intellectual Property Office Re. Application No. 10-2024-7011421 and its Translation Into English. (14 Pages).

* cited by examiner

CRYPTOCURRENCY WALLET AND CRYPTOCURRENCY ACCOUNT MANAGEMENT

RELATED APPLICATIONS

This application is a National Phase of PCT Patent Application No. PCT/IL2019/050181 having International filing date of Feb. 14, 2019, which claims the benefit of priority under 35 USC § 119(e) of U.S. Provisional Patent Application No. 62/630,923 filed on Feb. 15, 2018. The contents of the above applications are all incorporated by reference as if fully set forth herein in their entirety.

FIELD AND BACKGROUND OF THE INVENTION

The present invention, in some embodiments thereof, relates to a hardware cryptocurrency wallet and, more particularly, but not exclusively, to an electronically isolated hardware cryptocurrency wallet and methods of cryptocurrency account management.

Cryptocurrency, based on blockchain technology, described in a 2008 article by Satoshi Nakamoto, called "Bitcoin: A Peer-to-Peer Electronic Cash System," is a continuously growing list of records, called blocks, which are linked and secured using cryptography. The blockchain is a data structure that stores a list of transactions and may be thought of as a distributed electronic ledger that records transactions. The transactions are bundled into blocks and every block (except for the first block) refers back to or is linked to a prior block in the chain. Computer nodes maintain the blockchain and cryptographically validate each new block and thus the transactions contained in the corresponding block.

Since each block refers to or includes a cryptographic hash value of the prior block, it becomes difficult to modify or tamper with the data (the transactions) contained therein, as even a small modification to the data affects the hash value of the entire block. Thus, even though the contents of a blockchain may be available for all to see, they become practically immutable.

Cryptocurrency is a digital asset designed to work as a medium of exchange that uses blockchain to secure its transactions, to control the creation of additional units, and to verify the transfer of assets.

Cryptocurrency funds are typically stored in a digital wallet which contains a pair of keys. The wallet's public address is created from the public key and the private encryption key is the wallet password, granting its bearer the ability to spend the cryptocurrency contained in the wallet. There are many different ways in which these cryptocurrency wallets can be stored and accessed, such as on a hard drive, smartphone, or on an internet accessible server.

SUMMARY OF THE INVENTION

According to an aspect of some embodiments of the present invention there is provided a digital wallet device for storing and managing cryptocurrency, the digital wallet device is electronically disconnected from other digital devices and comprising: a cryptocurrency management integrated circuit (IC) that is isolated from any computer interface; a non-transitory computer readable storage medium mounted on the cryptocurrency management IC and storing a private key of a cryptocurrency and a public key of the cryptocurrency; a man-machine interface (MMI) for receiving an input from a user; at least one processor mounted on the cryptocurrency management IC for executing transaction code to create a transaction of the cryptocurrency based on the input and to sign the transaction using the private key; and a unidirectional communication hardware for sending the transaction to a communication device for broadcasting the transaction via a network.

Optionally, the unidirectional communication hardware includes a data diode.

Optionally, the unidirectional communication hardware includes a presentation unit for presenting a machine-readable code encoding the transaction, to be captured by a sensor and decoded by the communication device.

Optionally, the machine-readable code is a visual machine-readable code and the sensor is an imaging device.

Optionally, the presentation unit is a screen.

Optionally, the presentation unit is further presenting a user interface to be used by the user.

Optionally, the communication device is a mobile device; the sensor is a camera of the mobile device; and the decoding and the broadcasting is done by a software application installed on the mobile device.

Optionally, the input comprising at least one of a destination account address for the transaction and an amount for the transaction.

Optionally, the digital wallet device further comprises a sensor for capturing a destination machine-readable code encoding a destination account address for the transaction, wherein the destination machine-readable code is decoded by the at least one processor and the creation of the transaction is further based on the destination account address.

Optionally, the digital wallet device further comprises: a removable non-transitory computer readable storage medium storing the transaction code.

Optionally, the non-transitory computer readable storage medium includes a removable write-only data storage card storing the private key.

Optionally, the digital wallet device further comprises: an input IC that is isolated from the cryptocurrency management IC; and a sensor mounted on the input IC.

More optionally, the digital wallet device further comprises: an input component connected to the cryptocurrency management IC and is isolated from any other computer interface; and an output component electronically disconnected from the input component, the output component receiving a data piece from the input IC and presenting to a user a representation of the data piece, which is indicative of a desired input action by the user according to a physical structure of the input component.

Optionally, the MMI is a keyboard.

Optionally, the MMI is a touchscreen.

Optionally, the at least one processor is further executing code to create the private key and the public key.

Optionally, the private key is further sent via the unidirectional communication hardware.

Optionally, the at least one processor is further executing code to create a message request based on the input and to sign the message request using the private key; and the message request is sent by the unidirectional communication hardware to the communication device for transmitting to a smart contract capable of managing cryptocurrency based on the public key.

Optionally, the at least one processor is further executing code to create a cryptocurrency rule or definition and to sign the rule or definition using the private key.

Optionally, the at least one processor is further executing code to create policy for secure multi-signature scheme and to sign the policy using the private key; and the policy is sent by the unidirectional communication hardware to the communication device for sending to co-signers of the multi-signature scheme.

Optionally, the multi-signature scheme is based on one of standard blockchain multi-signature and encryption key splitting mechanism.

Optionally, the digital wallet device further comprises a mechanical input component for reading mechanically encoded data, wherein the creation of the transaction is further based on the mechanically encoded data.

According to an aspect of some embodiments of the present invention there is provided a method for transferring cryptocurrency by a digital wallet device that is electronically disconnected from other digital devices, comprising: receiving an input from a user via a man-machine interface (MMI) connected to a cryptocurrency management integrated circuit (IC) that is isolated from any computer interface; creating, by at least one processor mounted on the cryptocurrency management IC, a transaction of a cryptocurrency based on the input and signing the transaction using a private key of the cryptocurrency, the private key is stored in a non-transitory computer readable storage medium mounted on the cryptocurrency management IC; and sending, by a unidirectional communication hardware, the transaction, to a communication device for broadcasting the transaction via a network.

According to an aspect of some embodiments of the present invention there is provided an input system for transferring complex data between electronically disconnected computing devices, comprising: an input component connected to an input integrated circuit (IC), the input IC is isolated from any computer interface; and an output component electronically disconnected from the input component, the output component receiving a data piece from an output IC and presenting to a user a representation of the data piece, which is indicative of a desired input action by the user according to a physical structure of the input component.

Optionally, the output component also includes input capability to receive indication of the input action of the user.

More optionally, the output component is further presenting to the user an adjusted representation according to the indication of the input action.

Optionally, the input component and the output component are integrated in one physical device.

Optionally, the input component is a keyboard; the output component is a surface having a plurality of light sources, each of the light sources is adjacent to a key of the keyboard; and the representation includes turning on one of the plurality of light sources to indicate a desired pressing by the user on an adjacent key of the light source.

More optionally, when the adjacent key is pressed a next one of said plurality of light sources is turned on to indicate a desired pressing by the user on a next adjacent key of the next light source.

Optionally, the input IC is included in a digital wallet device.

Optionally, the output IC is included in a communication device connected to a network.

Optionally, the output component includes a remote indicator physically disconnected from the input component.

Optionally, the input IC is sending an indication of the input action of the user to the output IC via unidirectional communication hardware.

Optionally, the input IC is included in a first digital wallet device and the output IC is included in a second digital wallet device.

According to an aspect of some embodiments of the present invention there is provided a method of transferring complex data between electronically disconnected computing devices, comprising: receiving a data piece by an output component from an output integrated circuit (IC); and presenting to a user a representation of the data piece, wherein the representation is indicative of a desired input action by the user according to a physical structure of an input component, the input component is electronically disconnected from the output component; wherein the input is component is connected to an input IC, the input IC is isolated from any computer interface.

According to an aspect of some embodiments of the present invention there is provided a method of creating a cryptocurrency account having a short public address, comprising: using at least one processor mounted on an integrated circuit (IC) that is isolated from any computer interface for: generating a private key and a public key for a cryptocurrency account; instructing a transmission of a hash of the public key to be added to a blockchain of the cryptocurrency; receiving a timestamp of a time within a unique time slot in which the hash is added to the blockchain via a man-machine interface (MMI) of the device; verifying that the unique time slot is passed; and instructing a transmission of the public key to be registered into the blockchain, wherein a public address of the cryptocurrency account is comprising bits representing the timestamp and representing the public key.

Optionally, the public address includes bits created by a function operated on at least one of the timestamp and the public key.

Optionally, the representing the public key include a hash of the public key.

Optionally, unique time slot is one calendric day.

Optionally, each predetermined number of bits of the public address is represented by a word out of a predetermined list of words.

More optionally, the predetermined number of bits is 13.

Optionally, the public address comprises 13 bits representing the timestamp, 38 bits representing the public key, and one bit representing a method used to create the cryptocurrency account.

Optionally, the transferring of the hash is done by sending the hash via a unidirectional communication hardware.

Optionally, the transferring the hash is done by presenting a machine-readable code encoding the hash by a presentation unit of the device, to be captured by device sensor and decoded by a communication device for broadcasting the hash via a network.

Optionally, the transferring of the public key is done by sending the public key via a unidirectional communication hardware.

Optionally, the transferring the public key is done by presenting a machine-readable code encoding the public key by a presentation unit of the device, to be captured by device sensor and decoded by a communication device for broadcasting the public key via a network.

According to an aspect of some embodiments of the present invention there is provided a method of creating a cryptocurrency account having a short public address, comprising: receiving from a device which is electronically disconnected from other digital devices a hash of a public key generated for a cryptocurrency account by the device; broadcasting the hash to be added to a blockchain of the cryptocurrency; receiving a timestamp of a calendric time within a unique time slot in which the hash is added to the blockchain; presenting the timestamp to a user for inputting via a man-machine interface (MMI) into the device; receiving from the device, after the unique time slot is passed, the public key; and transmitting the public key to be registered into the blockchain, wherein a public address of the cryptocurrency account is comprising bits representing the timestamp and representing the public key.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF EMBODIMENTS OF THE INVENTION

Figure 1:
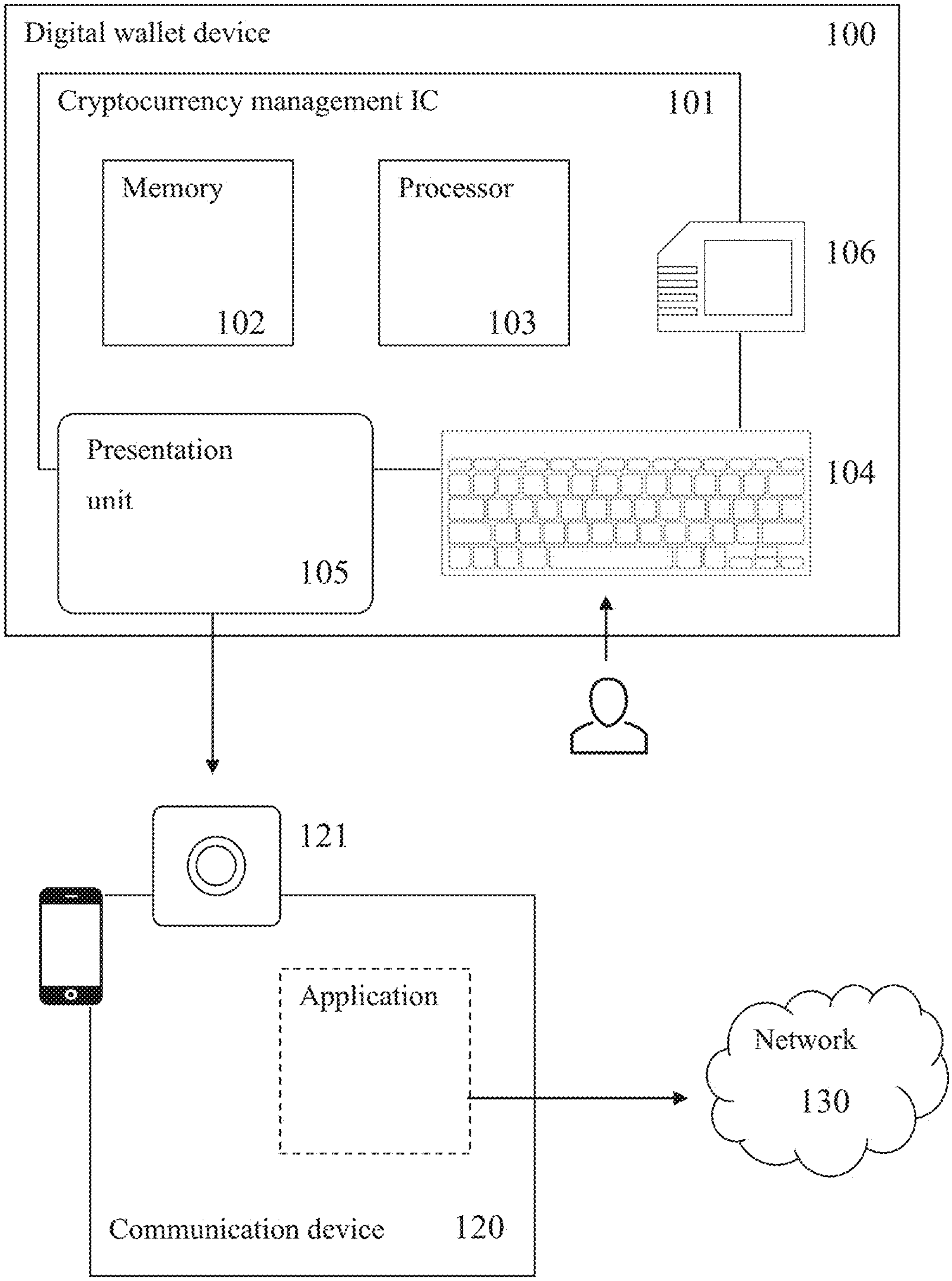
FIG. 1 is a schematic illustration of a digital wallet device for storing and managing cryptocurrency which is electronically disconnected from other digital devices, according to some embodiments of the present invention.

The present invention, in some embodiments thereof, relates to a hardware cryptocurrency wallet and, more particularly, but not exclusively, to an electronically isolated hardware cryptocurrency wallet and methods of cryptocurrency account management.

According to some embodiments of the present invention, there is provided a cryptocurrency wallet device which is completely isolated from any other electronic device and receives input only by a user via a man-machine interface (MMI). This provides maximal security for the private key(s) stored in the wallet device, as there is no way to remotely hack into the wallet device.

One vulnerability of digital wallets is that a malicious entity, even with no physical access to the machine on which the wallet resides, may use malicious code to gain access to the wallet and transfer all funds to a third party account, effectively stealing the funds. Wallets may be encrypted, so they may only be accessed and used in the presence of a secret key or password, but these encryptions are also potentially vulnerable to remote hacking. Existing hardware cryptocurrency wallets may be disconnected from the internet most of the time, but such connection (whether direct or indirect) is still required for transactions to be broadcast.

To transfer cryptocurrency from an account stored in the wallet device, the user manually enters, via MMI of the wallet device such as a keyboard, the amount of cryptocurrency to be transferred and the address of the account to which the cryptocurrency should be transferred to. A processor in the wallet device creates a transaction and signs it using the private key of the account, which is stored on a memory of the wallet device. To broadcast the transaction, the transaction is sent via a unidirectional communication hardware to a communication device which broadcasts the transaction to the blockchain system, to be added to the blockchain. The unidirectional communication hardware provides electronic separation, and is transferring data by having a transmitting-only component on one side, and a receiving-only component on the other side.

For example, the unidirectional communication hardware may include a presentation unit of the wallet device (transmitting-only component), and a sensor of the communication device (receiving-only component). For example, a machine-readable code that encodes the transaction (for example a visual code such as a quick response (QR) code or linear barcode) is presented on the presentation unit of the wallet device (such as a screen). This code is captured by the sensor (for example an imaging device such as a camera), decoded, and broadcasted by the communication device to the blockchain system. This may be done, for example, by an application on a mobile phone.

Alternatively, the unidirectional communication hardware may be a unidirectional network component such as a data diode, which is a network hardware having a separated transmitter (at the wallet device side) and receiver (at the communication device side) and is allowing continuous data travel only in one direction.

Optionally, the wallet device also includes a sensor, for example an imaging device such as a camera. This allows easier input of the destination account address, which is usually a long code that is difficult for a human to type without errors and/or other data required for the transaction. This may be done, for example, by scanning a machine-readable code that encodes destination account address which is presented for example on a screen of a mobile phone. This wallet device having a sensor is less secure than a wallet device having no sensor, because there is a chance that a device which generates the machine-readable code is hacked and encoded a different account address or even malicious code in the machine-readable code.

Optionally, two wallet devices, one without a sensor (secure) and one having a sensor (less secure), may be used in combination to provide different levels of security. The wallet device having a sensor may be used for storing an account with smaller amounts of cryptocurrency for convenient frequent use, while larger amounts of cryptocurrency may be saved in an account stored in the wallet device having no sensor and providing maximal security. In this configuration, a new cryptocurrency account for the less secure wallet device may be created by the secure wallet device and transferred to the account of the less secure wallet, so the secure wallet device stores the address of this new cryptocurrency account and easily transfers cryptocurrency to this account without further destination account address input required. Optionally, very small amounts of cryptocurrency may be stored in non-secure account(s) on the communication device.

According to some embodiments of the present invention, there is provided an input system for transferring complex data between electronically disconnected computing devices. This allows a user to input a complex and/or long data piece into a computing device, when a direct electronic connection to transfer the data is not possible, for example in a cryptocurrency wallet device. The system includes an input component connected to an integrated circuit (IC) that is isolated from any computer interface (optionally included in a computing device that is electronically disconnected from other digital devices); and an output component electronically disconnected from the input component (which optionally also include input capabilities), and receiving data from another IC (optionally included in a computing device) which may be less secure. The output component presents to the user a representation of the data piece, which indicates to the user how to input the data piece into the input component, according to a physical structure of the input component. For example, the system may include a keyboard input component and a surface output component that is attached to the keyboard and includes light sources, each adjacent to a key on the keyboard. A light source is turned on to indicate to the user that the adjacent to a key should be pressed. When the user presses a key, the surface is also pressed and the next light source for the next key may be presented, or an indication of the user pressing the wrong key. For example, the system may include a keyboard input component and a remote indicator such as a laser, which points to the key on the keyboard.

According to some embodiments of the present invention, there is provided cryptocurrency wallet device which is completely isolated from any other electronic device and includes two ICs that are completely isolated from each other. The wallet device may be an integrated device, such as a credit card shaped device. A cryptocurrency management IC is mounting the memory, the processor and connected to a presentation unit, and an input IC is mounting a sensor such as an imaging device. Optionally, the wallet device includes an input system as described above, so the input is connected to the output component and the cryptocurrency management IC is connected to the input component. A representation of data acquired by the sensor is presented to the user, so he may input it via the input component to the processor.

According to some embodiments of the present invention, there is provided a cryptocurrency and a cryptocurrency protocol wherein an account address is short, memorable and/or easy to type. In existing cryptocurrency protocols, for example in Ethereum, the account address is the last 160 bits of the hash (sha3-256) of the public key related to the account, which is difficult for a human to type without errors, for example in an MMI of a wallet device which is completely isolated from any other electronic device. To use fewer bits, while still preventing two accounts having the same last bits of the hash to be created, it is possible to require new accounts to register in the blockchain by announcing their public key. However, when using such a protocol in a digital wallet device that relays on a compromised communication device to announce the public key to the blockchain system, the compromised communication device may create a second account with the same last bits of the hash and announce the public key of the second account to the blockchain system instead.

A new cryptocurrency protocol is suggested, wherein a wallet device first broadcasts a hash (different from the address hash) of the public key of a newly created account to the blockchain system, via a communication device that may be compromised. The hash is created by implementing a cryptographic hash function on the public key. The hash is added to the blockchain system in a specific time within a unique time slot, which is inputted by the user to the wallet device. Only after that unique time slot is passed, the wallet device announces the unhashed public key to the blockchain system. It may then be verified that the hash added to the blockchain system is indeed that of the correct public key. The account address includes bits representing the unique time slot and hashed bits of the public key. Optionally, each number of bits of the public account address is represented by a word out of a list, so it is easier for a user to type the words via the MMI and/or remember the public account address. For example, each 13 bits may be represented by a word, so a 52 bit public account address is represented by 4 only words, which are easy to type in an MMI.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to the drawings, FIG. 1 is a schematic illustration of a digital wallet device for storing and managing cryptocurrency which is electronically disconnected from other digital devices, according to some embodiments of the present invention.

Digital wallet device 100 includes a cryptocurrency management IC 101 that is isolated from any computer interface. A computer interface may include any direct digital connection to another computing device that transfers data, either physical or wireless. This means that cryptocurrency management IC 101 does not include any electronic connectors, wireless interface(s), sockets and/or electronic connections which are connected to any IC outside digital wallet device 100. Digital wallet device 100 has no bidirectional digital communication with other electronic devices, such as computer, digital component and/or IC, internet of things (IoT) devices, and/or any other electronic device. Digital wallet device 100 is non-interactive, and may only present or transmit data, but not receive data directly from another electronic device.

Cryptocurrency management IC 101 mounts a non-transitory computer readable storage medium (or memory) 102, storing one or more pairs of a private key and a public key of a cryptocurrency. Memory 102 may include one or more non-transitory persistent storage devices, for example, a hard drive, a Flash array and/or the like.

The cryptocurrency may be any type of compatible cryptocurrency based on a blockchain, for example Ether, ripple, neo and/or any other cryptocurrency. The cryptocurrency may also be specifically designed for best performance with digital wallet device 100, as described above and below.

The blockchain is managed by a blockchain system, which may be a public blockchain computer system that includes many different individual computer systems that are operated by different entities that maintain a single blockchain. Alternatively, the blockchain system may include one or more individual computer systems that are all operated by a single entity (e.g., a private or closed blockchain computer system). The blockchain system includes multiple different computer nodes that each operates to "mine" and thereby validate transactions submitted to the blockchain. Once a transaction is broadcast to the blockchain system, at least one node receives the transaction and it may propagate the transaction to other nodes within the blockchain system. Cryptocurrency may be transferred from one cryptocurrency account to another, by registering the transaction of the transfer in the blockchain.

Cryptocurrency management IC 101 also mounts at least one processor 103. Processor 103 may include one or more processors arranged for parallel processing, such as clusters and/or as one or more multi core processor(s), neural network hardware, and/or any other processing hardware.

Digital wallet device 100 also includes an MMI 104 for receiving an input from a user. MMI 104 may include, for example, a keyboard which may be a physical keyboard with physical buttons or may be a virtual keyboard presented on a touchscreen, a pointing device such as a computer mouse, a joystick controller and/or any other device for direct input by a human.

Digital wallet device 100 also includes unidirectional communication hardware. The unidirectional communication hardware may be, for example a presentation unit 105. Presentation unit 105 presents a machine-readable code and optionally also presents a user interface. Presentation unit 105 may be a screen, a plotter, a printer, voice output device such as speakers, three-dimensional graphics device, an antenna for transmitting electromagnetic waves such as radio and/or any other output device for presenting information to a human and/or machine.

Digital wallet device 100 also includes a power supply, for example a battery and/or a connection to an external power source.

Optionally, digital wallet device 100 also includes removable non-transitory computer readable storage medium (memory) 106 such as a memory card, flash card or a removable hard drive. Removable memory 106 may be storing the transaction code and/or any other software module(s), for example, an OS, an application code, a tool, an agent, a service, a script and/or the like, each comprising a plurality of program instructions that may be executed by processor 103. This provides an option to update, upgrade and/or otherwise replace any of these software modules by removing and replacing removable memory 106, for example to add new actions and/or add support for new types of cryptocurrencies. Alternatively, some or all of these software modules are stored in memory 102.

Optionally, digital wallet device 100 and/or memory 102 also include removable write-only data storage card, such as a smart card, chip card, or integrated circuit card (ICC), and/or any pocket-sized card that has embedded integrated circuits. Optionally, digital wallet device 100 and/or memory 102 also include a hardware security module (HSM). The write-only card or HSM may be used to create and store the public key and private key of the account. The write-only card or HSM includes an integrated processor which may execute instruction to sign using the private key, for example sign a transaction. Since the private key cannot be copied from the write-only card, it provides more security from physical theft of the private key. This also allows a user to easily insert or replace the account information in the digital wallet device 100, and optionally store the write-only card separately to prevent physical theft.

Optionally, digital wallet device 100 is physically contained within a tamper resistant enclosure. Optionally, the enclosure is designed to detect tampering and react for example by deleting the data in memory 102.

Figure 2:
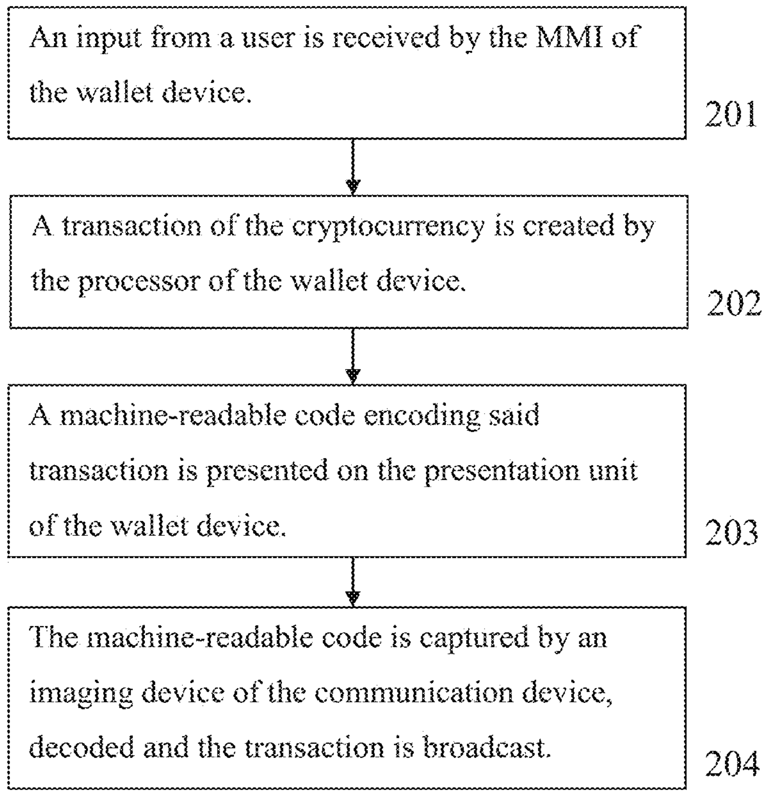
FIG. 2 is a flowchart schematically representing a method for transferring cryptocurrency by a digital wallet device, according to some embodiments of the present invention.
Figure 3:
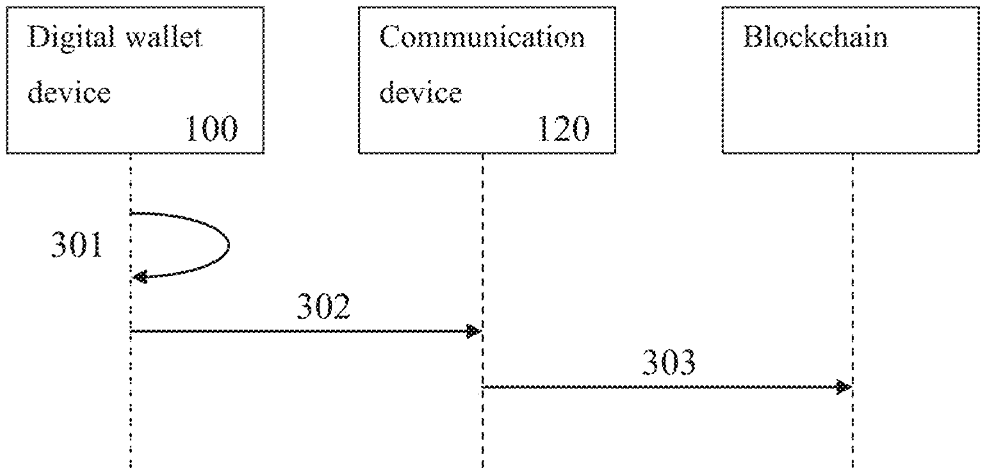
FIG. 3 is a sequence diagram schematically representing a method for transferring cryptocurrency by a digital wallet device, according to some embodiments of the present invention.

Reference is now made to FIG. 2, which is a flowchart schematically representing a method for transferring cryptocurrency by a digital wallet device, according to some embodiments of the present invention. Reference is also made to FIG. 3, which is a sequence diagram schematically representing a method for transferring cryptocurrency by a digital wallet device, according to some embodiments of the present invention.

First, as shown at 201 and 301, an input from a user is received by MMI 104. The input may include a destination account address for the transaction and an amount for the transaction. The input may also include a desired transaction fee and/or any other information needed for the creation of a transaction, according to the type of cryptocurrency. The destination account address may be selected from known destination account addresses, for example from a contact list that is stored for example on memory 102.

The input may be of any data type, for example integers, booleans, characters, alphanumeric strings and/or any other type. Optionally, the input data type includes or may be translated to hexadecimal numeral system commonly used in cryptocurrency.

Then, as shown at 202, a transaction of the cryptocurrency is created and signed by processor 103, by executing a transaction code. The creation of the transaction is done using the destination account address and the amount (input received from the user) and optionally other information, for example, gas limit, nonce (increased in every transaction) and/or other metadata. The transaction is based on a protocol that is relevant for the specific cryptocurrency, for example Ethereum protocol for Ether cryptocurrency. This may include implementing cryptographic hash function(s) such as Sha3 or any other function according to the type of cryptocurrency. The transaction is signed using the private key of the cryptocurrency that is stored in memory 102. The signing is done, for example, using elliptic curve digital signature algorithm (ECDSA), Rivest-Shamir-Adleman (RSA) cryptosystem, Digital Signature Algorithm (DSA), Rabin cryptosystem and/or any other algorithm or protocol based on the type of cryptocurrency.

Then, as shown at 203, a machine-readable code encoding said transaction is presented on presentation unit 105. The machine-readable code may be, for example a visual code such as a linear barcode or a matrix barcodes such as QR code, a color coded image and/or any other visual representation of data that may be identified by a computer. The machine-readable code may also include sound, electromagnetic waves and/or any other output.

Then, as shown at 204 and 302, the machine-readable code is captured by a sensor such as imaging device 121 and decoded by a communication device 120 for broadcasting the transaction via a network 130 to the blockchain system to be added to the blockchain, as shown at 303.

Alternatively, the transaction data may be transferred to communication device 120 via any other unidirectional communication hardware, for example via a data diode.

Optionally, communication device 120 verifies that there is enough cryptocurrency left in the cryptocurrency account to perform the transaction. This cannot be done by digital wallet device 100, as the information regarding the account is located in the blockchain system and requires network communication to obtain. Optionally, when there is not enough cryptocurrency left in the cryptocurrency account to perform the transaction, communication device 120 cancels the transaction, for example by deleting the transaction without broadcasting the transaction. Imaging device 121 may include one or more light capturing sensors, for example, a single or dual sensor camera of a mobile client device, a webcam, a single-lens reflex camera (SLR), an action camera, a depth sensing camera, an omnidirectional camera, camera included in a wearable device such as 'smart-glasses' and/or any type of digital camera.

A sensor may also include an acoustic or sound sensor such as a microphone, vibration sensor, electromagnetic sensor, an antenna that may receive electromagnetic waves and/or any other device, module, and/or subsystem whose purpose is to detect its environment.

Communication device 120 may include one or more computing devices such as a mainframe computer, an enterprise server, a workstation, multiple connected computers, one or more virtual machines and/or a personal computer. Communication device 120 may also be, for example, processing node, computer, laptop, server, mobile device, wearable device such as 'smart-glasses' and/or any processing device.

The actions of decoding the machine-readable code and/or broadcasting the transaction may be performed by a software application installed on communication device 120. The application may perform other actions, for example similar to actions performed by existing cryptocurrency wallet applications, such as presenting information regarding any cryptocurrency account (including account(s) stored in digital wallet device 100), creating storing and/or managing non-secure cryptocurrency account(s), presenting log of performed actions, and/or any other action.

Communication device 120 may be connected to imaging device 121 or include imaging device 121. Communication device 120 includes a communication module, such as a network card, a communication chip and/or any other communication component for connecting to network 130.

Network 130 may include, for example, local area network (LAN), a wireless network such as mobile network, wireless local area network (WLAN) such as Wireless Fidelity (WiFi™), a wireless personal area network (WPAN) such as Bluetooth™ protocol, near-field communication (NFC) and/or any other network.

Optionally, a new account of the cryptocurrency may be created by processor 103 by generating a pair of a private key and a public key. The key of the new account may be transferred to another device, so the account address is known to digital wallet device 100.

Optionally, an existing cryptocurrency account may be inserted into digital wallet device 100 to be stored in memory 102. This may be done by a user inputting the private key of the account via MMI 104.

Optionally, an existing cryptocurrency account may be extracted from memory 102 to another device. This may be done via a unidirectional communication hardware, for example by presenting a machine-readable code encoding the private key of the existing cryptocurrency account on presentation unit 105.

Optionally, using digital wallet device 100 and/or communication device 120 requires a user authentication process, for example a two-factor authentication that includes a password and biometric data.

Optionally, for a cryptocurrency that requires input from the blockchain system to create a transaction (such as NEO), a smart contract based on the blockchain system may be used. This is done to avoid inputting this blockchain system input by the user. A smart contract on the blockchain system is created, that holds the cryptocurrency owned by the account that is stored in digital wallet device 100. The contract may transfer cryptocurrency from the account, without a transaction created by digital wallet device 100. To transfer cryptocurrency from a third party to that account, the third party transfers the cryptocurrency to the contract.

Figure 4:
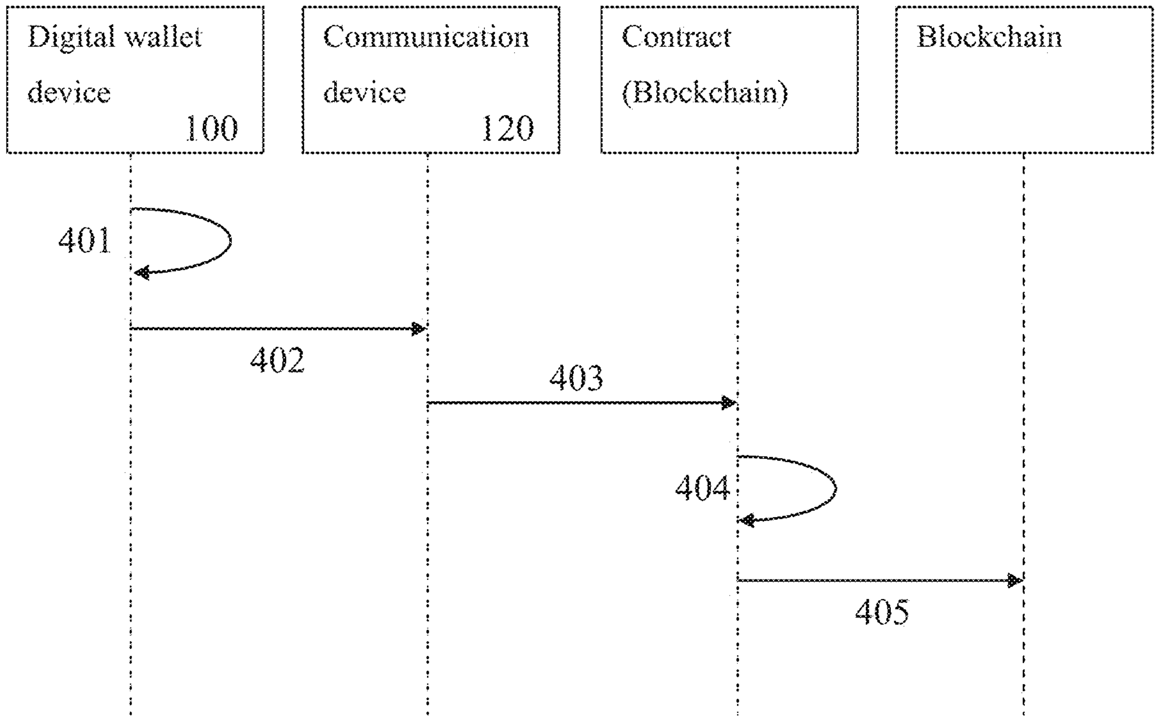
FIG. 4 is a sequence diagram schematically representing a method for transferring cryptocurrency by a digital wallet device via a smart contract, according to some embodiments of the present invention.

Reference is also made to FIG. 4, which is a sequence diagram schematically representing a method for transferring cryptocurrency by a digital wallet device via a smart contract, according to some embodiments of the present invention. When the user wants to transfer cryptocurrency from the account, he inputs the destination account address and the amount into digital wallet device 100, as described above. As shown at 401, digital wallet device 100 creates (optionally by processor 103) a message request. The message request includes the destination account address, the amount and a nonce, and is signed using the private key of the account. Then, as shown at 402, the message request is transferred to communication device 120 (optionally via presentation unit 105). Then, as shown at 403, communication device 120 wraps the message request by a transaction and transfers the message request to the contract. As shown at 404, the contract validates the signature of the account by using the public key of the account. When the message request is of the correct format, including all necessary data, and the signature is validated, the contract executes the transaction by adding it into the blockchain, as shown at 405. From the user's perspective, the process is identical to transferring cryptocurrency directly from digital wallet device 100 by creating a transaction.

Optionally, digital wallet device 100 creates (optionally by processor 103) transaction rules and/or definitions, for example, rules for creating a smart contract, a message request for creating a smart contract, policy for multi-signature scheme and/or any other rules and/or definitions to be broadcast to the blockchain and/or sent to any other entity. A policy for multi-signature scheme may include for example standard blockchain multi-signature rules (for example using Bitcoin script) or policy for encryption key splitting mechanism such as multiparty computation (MPC) based multi-signature. Digital wallet device 100 signs the transaction rules and/or definitions using the private key. Since digital wallet device 100 is disconnected from the internet, this ensures that the transaction rules and/or definitions are authentic. The transaction rules and/or definitions may then be sent to communication device 120 which broadcasts it to the blockchain and/or sends it to other entities. For example, digital wallet device 100 creates rules for multi-signature (for example, that the sum of all transactions broadcast to the blockchain by a wallet in one day is less than 100 coins). The rules are sent to the co-signers of the multi-signature scheme (participants of the multi-signature process) after being signed by the private key, and cannot be compromised or changed. Each co-signer decides, based on the rules, if they would sign or not. A less secure digital wallet for example, which may be connected, located, and/or used by communication device 120, may then safely use the rules. This prevents a situation of communication device 120 being compromised, for example by a hacker attack, so rules created by the less secure digital wallet are faulty and cause co-signers to sign illegitimate transactions based on the faulty rules.

Optionally, digital wallet device 100 also includes a sensor such as an imaging device 107, or any other sensor as described above, for capturing machine-readable code.

Figure 5:
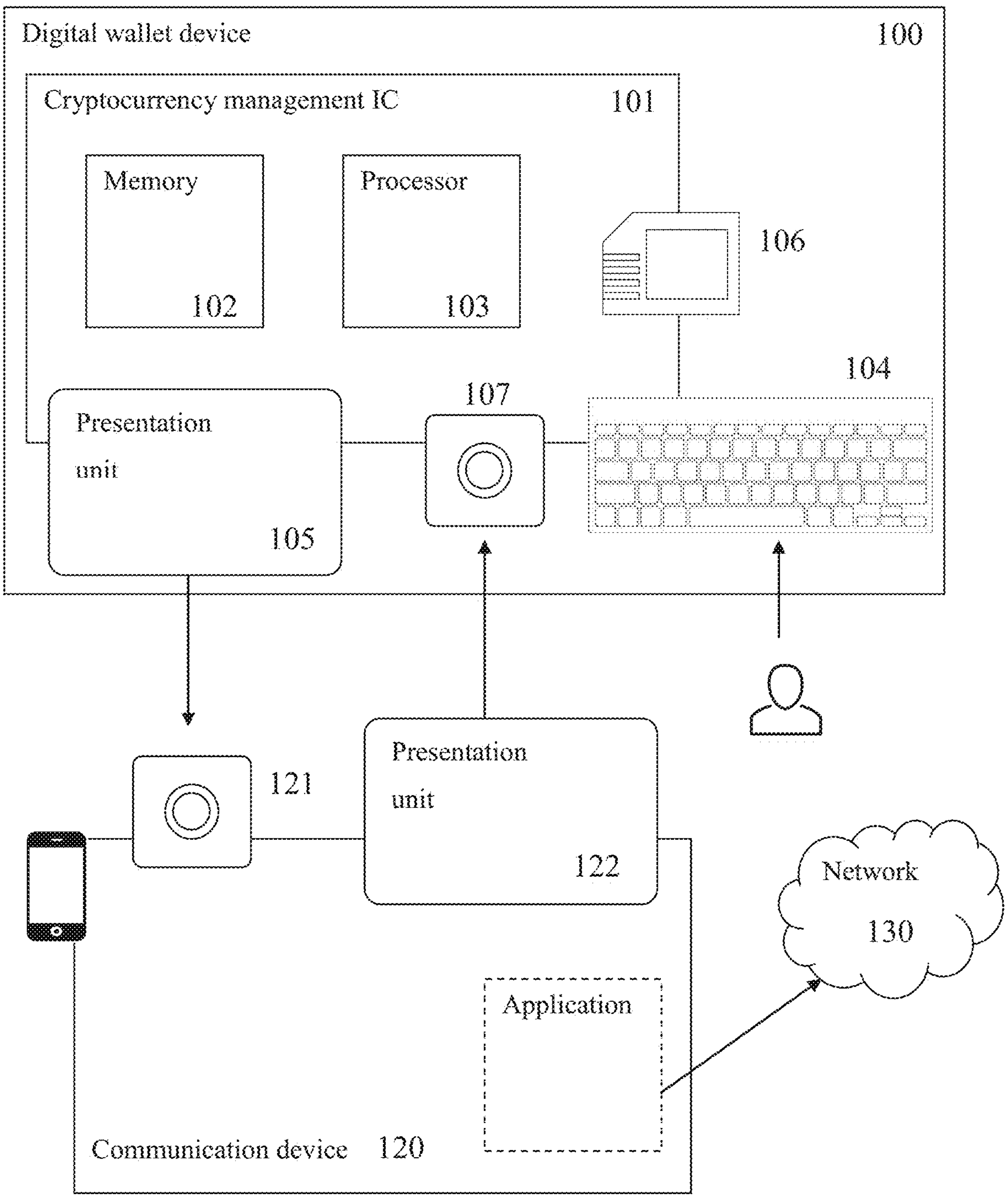
FIG. 5 is a schematic illustration of a digital wallet device having an imaging device for storing and managing cryptocurrency which is electronically disconnected from other digital devices, according to some embodiments of the present invention.
Figure 6:
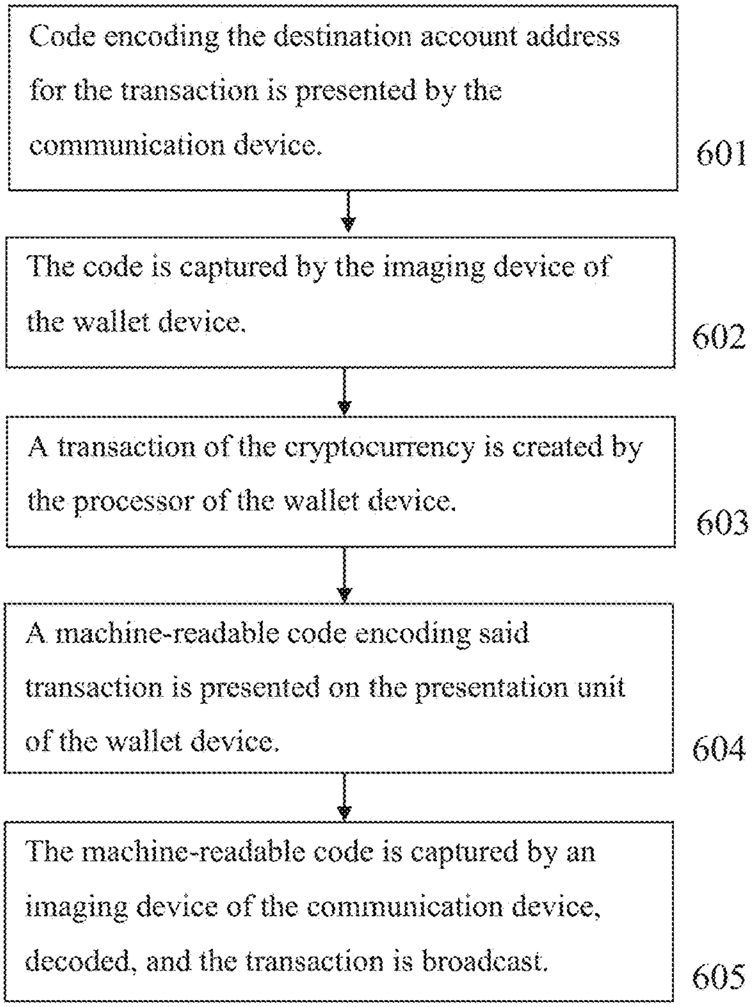
FIG. 6 is a flowchart schematically representing a method for transferring cryptocurrency by a digital wallet device having an imaging device, according to some embodiments of the present invention.
Figure 7:
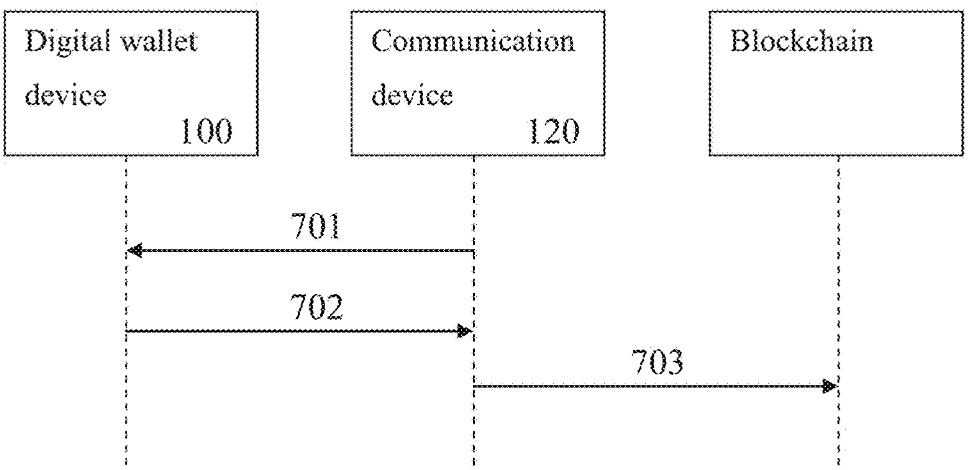
FIG. 7 is a sequence diagram schematically representing a method for transferring cryptocurrency by a digital wallet device having an imaging device, according to some embodiments of the present invention.

Reference is now made to FIG. 5, which is a schematic illustration of a digital wallet device having an imaging device for storing and managing cryptocurrency which is electronically disconnected from other digital devices, according to some embodiments of the present invention. Reference is also made to FIG. 6, which is a flowchart schematically representing a method for transferring cryptocurrency by a digital wallet device having an imaging device, according to some embodiments of the present invention. Reference is also made to FIG. 7, which is a sequence diagram schematically representing a method for transferring cryptocurrency by a digital wallet device having an imaging device, according to some embodiments of the present invention.

Imaging device 107 may include any one or more light capturing sensors as described above for imaging device 121.

First, as shown at 601, a machine-readable code encoding a destination account address for the transaction, and optionally any other input such as an amount for the transaction, is presented, for example on a presentation unit 122 of communication device 120. Presentation unit 122 may be for example a screen, as described above for presentation unit 105. The destination account address, amount and/or other input may be previously inserted or selected by the user in an application installed on communication device 120. Using a machine-readable code in this case (in contrast, for example, to using continuous unidirectional communication hardware such as data diode) provides inherent limitation over the amount of data being transferred, and therefore increased security.

Then, as shown at 602 and 701, the machine-readable code is captured by imaging device 107 and decoded by processor 102.

Then, as shown at 603 a transaction of the cryptocurrency is created by processor 103, using the destination account address (decoded from the machine-readable code) and the amount, and the transaction is signed, as described above for 202 and 302.

Steps shown at 604-605 and 702-703 are performed as described above for 203-204 and 302-303.

Optionally, an existing cryptocurrency account may be inserted into a digital wallet device having imaging device 107, by capturing a machine-readable code encoding the private key of the existing account, for example presented by communication device 120.

Optionally, two digital wallet devices, one having a sensor such as an imaging device and one without a sensor, may be used in combination to provide different levels of security.

Figure 8:
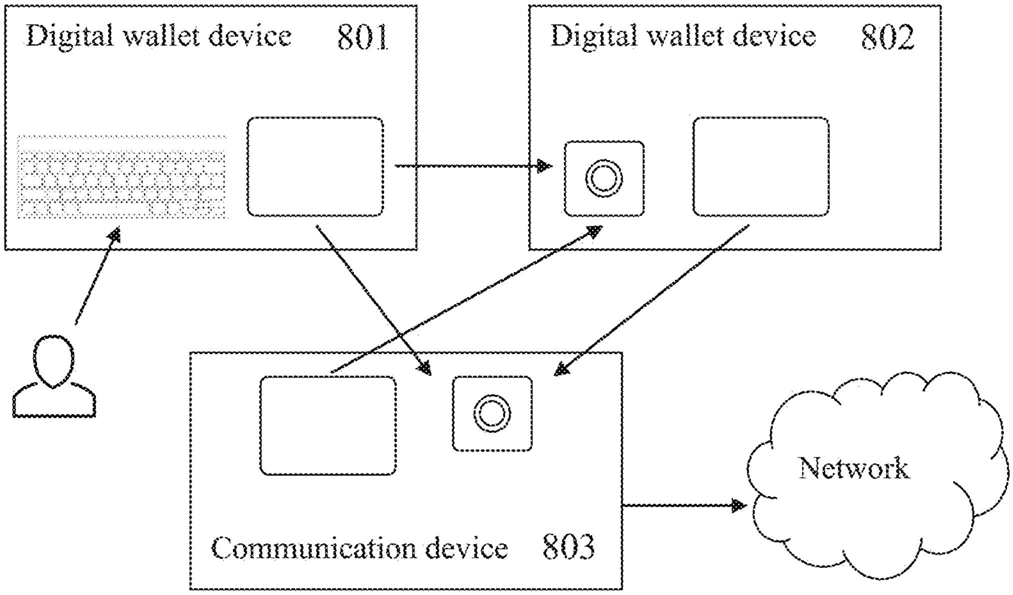
FIG. 8 is a schematic illustration of a two digital wallet devices for storing and managing cryptocurrency which are electronically disconnected from other digital devices, according to some embodiments of the present invention.

Reference is now made to FIG. 8, which is a schematic illustration of a two digital wallet devices for storing and managing cryptocurrency which are electronically disconnected from other digital devices, according to some embodiments of the present invention. In this configuration, large amounts of cryptocurrency may be saved in account(s) stored in digital wallet device 801, while smaller amounts of cryptocurrency may be saved in account(s) stored in digital wallet device 802 which has an imaging device and therefore less secure, to be used more frequently and easily using the imaging device to input destination account addresses.

Optionally, for convenience of transferring cryptocurrency from digital wallet device 801 to digital wallet device 802 for frequent use, a new account for use in digital wallet device 802 may be created by digital wallet device 801, so digital wallet device 801 knows this account address and no input is required.

Figure 9:
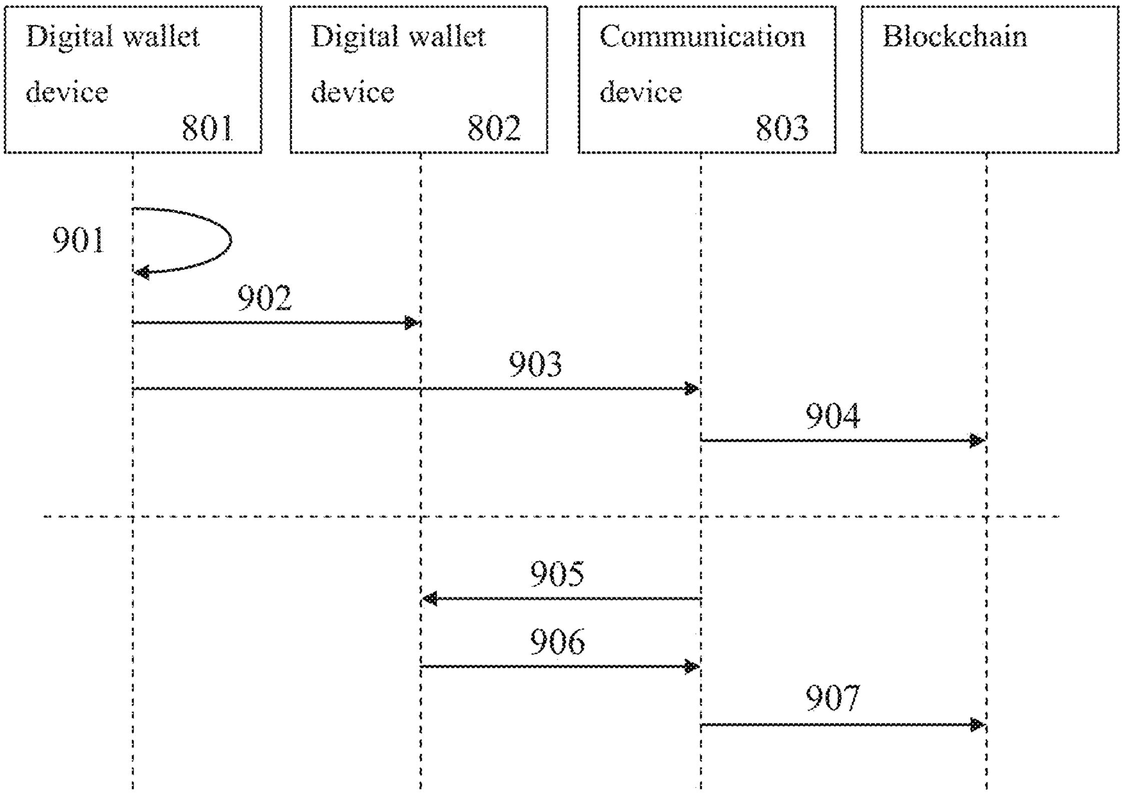
FIG. 9 is a sequence diagram schematically representing a method for creating a cryptocurrency account by a digital wallet device without an imaging device for a digital wallet device having an imaging device and performing transactions, according to some embodiments of the present invention.

Reference is now made to FIG. 9, which is a sequence diagram schematically representing a method for creating a cryptocurrency account by a digital wallet device without an imaging device for a digital wallet device having an imaging device and performing transactions, according to some embodiments of the present invention.

A new cryptocurrency account is created by a processor of digital wallet device 801 by generating a pair of private key and public key (901). The keys are transferred to digital wallet device 802 (902), for example by presenting a machine-readable code encoding the keys on a presentation unit of digital wallet device 801 and capturing the code by an imaging device of digital wallet device 802. Cryptocurrency may be transferred from a current cryptocurrency account stored in digital wallet device 801 to the new account stored in digital wallet device 802 by a transaction as described above, using communication device 803 (903), which broadcasts the transaction to the blockchain system (904). The creation of the transaction is simple for the user, as digital wallet device 801 knows the account address and no input is required. Now, cryptocurrency may be transferred from the new cryptocurrency account stored in digital wallet device 802 (905-907), as described above for 701-703.

Optionally, digital wallet device 100 also includes a mechanical input component that reads mechanically encoded data having a finite number of characters, for example a destination account address for a transaction and/or any other data necessary for a transaction according to the type of cryptocurrency. This may include, for example, a punch card, punched tape, magnetic ink character recognition (MIRC) and/or other readable mechanical storage of data. The user is able to see the data encoded in the mechanical input component, and verify that it is the correct data before inputting it to digital wallet device 100. The data may be mechanically encoded by a device, optionally connected to communication device 120, for example a punching machine.

Optionally, MMI 104 includes an input system that provides indication to the user and guides him in inputting the destination account address.

Figure 10:
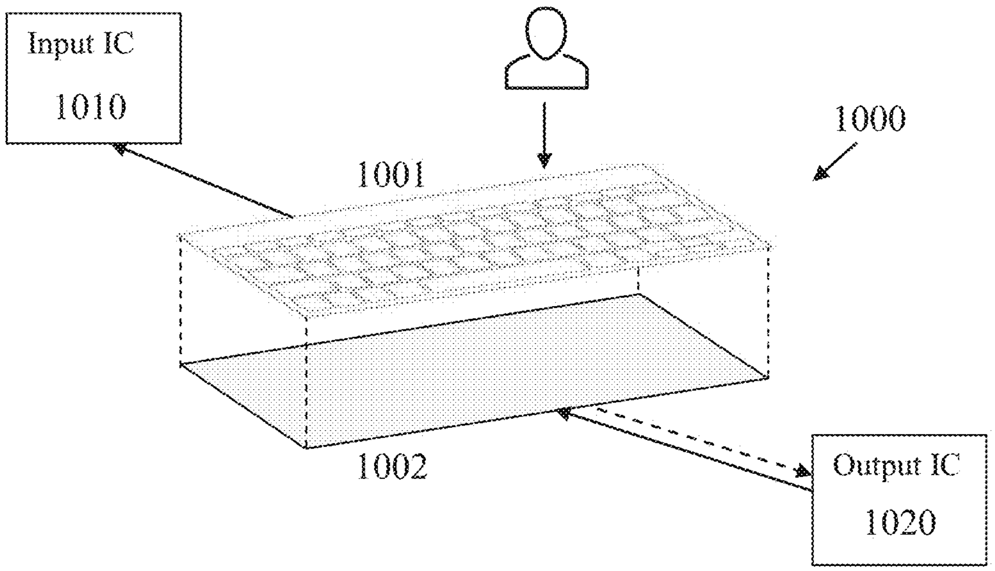
FIG. 10 is a schematic illustration of an input system for transferring complex data between electronically disconnected computing devices, according to some embodiments of the present invention.
Figure 11:
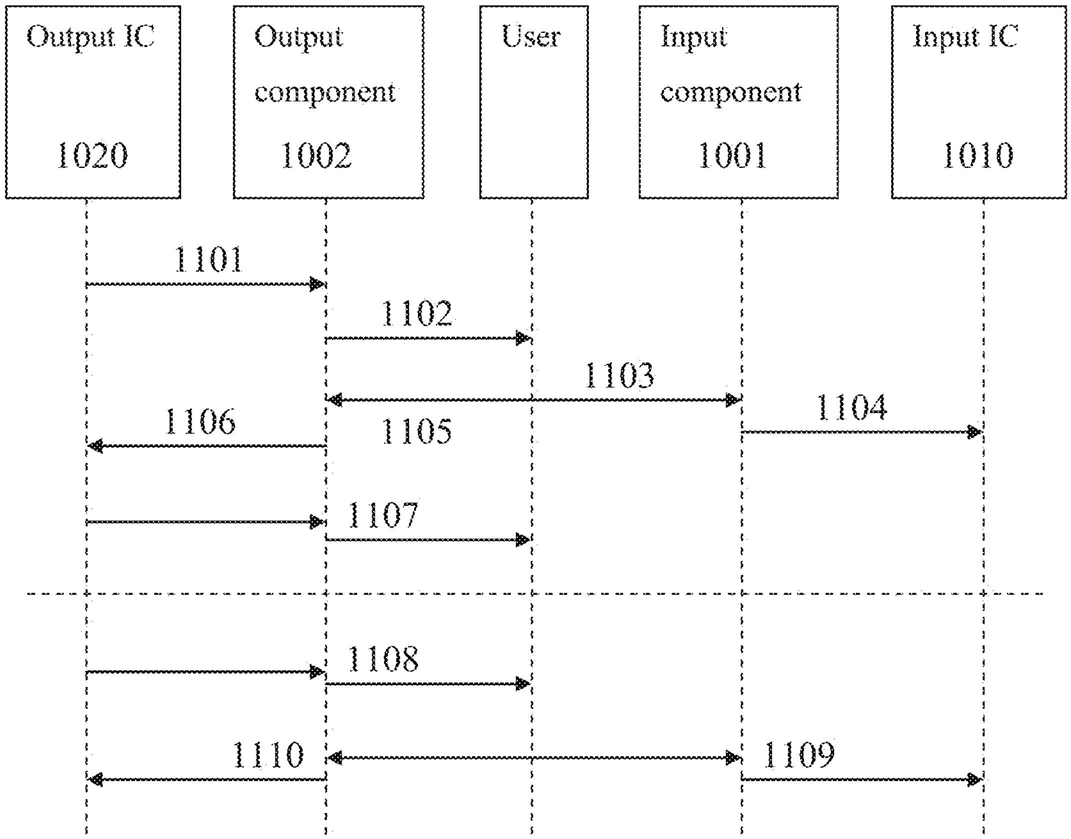
FIG. 11 is a sequence diagram schematically representing a method for using an input system for transferring complex data between electronically disconnected computing devices, according to some embodiments of the present invention

Reference is now made to FIG. 10, which is a schematic illustration of an input system for transferring complex data between electronically disconnected computing devices, according to some embodiments of the present invention. Reference is also made to FIG. 11, which is a sequence diagram schematically representing a method for using an input system for transferring complex data between electronically disconnected computing devices, according to some embodiments of the present invention.

The method provides a solution for inputting complex and/or long data piece into a computing device, when a direct electronic connection to transfer the data is not possible.

Input system 1000 includes an input component 1001 connected to an input IC 1010 which is electronically disconnected from other digital devices, for example digital wallet device 100. Input system 1000 also includes an output component 1002, electronically disconnected from input component 1001, and connected to an unsecure output IC 1020, for example included in communication device 120. Input component 1001 and output component 1002 may be separate, adjacent or integrated in the same physical device.

First, output component 1002 receives a data piece from output IC 1020 that should be inputted into input IC 1010 (1101). Output component 1002 then presents a representation of the data piece to the user (1102). The representation is indicative of an input action by said user according to a physical structure of input component 1001. The representation may include, for example, visual representation such as a sequence of lights that indicate buttons that should be pressed by the user on input component 1001, a pattern, one or more single scribbles or shape(s) presented on a screen that should be drawn by the user on a touchscreen of input component 1001, a sequence of sounds and/or any other indication. The representation may be an encoded version of the data piece.

Then, the user inputs the data via input component 1001 according to the representation (1103) and the data piece is transferred to input IC 1010 (1104). Optionally, an indication of the data piece that is inputted by the user is also transferred to output IC 1020 (1106), for example via output component 1002 (1105) when output component 1002 also includes input capability, or directly from input IC 1010 via one-directional communication. Then, output component 1002 may present adjusted representation based on the user's input. Optionally, when the user inputted the correct data piece, a next representation of a next data piece to be inputted into input IC 1010 is presented by output component 1002 (1107). Optionally, when the user inputted the wrong data piece, an indication of the error is presented by output component 1002 (1108). The user may then input a command to restart the process (1109 and 1110), so the original representation is presented again by output component 1002, for the user to retry inputting the data piece correctly.

For example, input component 1001 may be a keyboard, and output component 1002 may include a surface that is attached to the keyboard. For example, the surface may be laid on top of the keyboard or blow the keyboard when the keyboard is transparent. The surface may include light sources, such as light emitting diodes (LEDs), each adjacent to a key on the keyboard. A light source on the surface is turned on to indicate to the user that the adjacent key should be pressed next. When the user presses a key, the surface is also pressed and the input may be transferred back to output IC 1020. When the user presses the correct key, the light source adjacent to the next key is turned on, so the user is guided to press a sequence of keys. When the user presses a wrong key, all the light sources may be turned on simultaneously, for example, to indicate the error, and after the user presses a key to restart the process, the first light source may be turned on to restart the sequence.

For another example, input component 1001 may be a keyboard, and output component 1002 may include a remote indicator, which directs the user to the next data piece. For example, the remote indicator may include a laser pointed to the correct key to be pressed next, an augmented reality device presenting an image indication on top the user's vision of the keyboard, an audio speaker reading to the user the keys to be pressed, and/or any other indication device physically disconnected from input component 1001.

For another example, input component 1001 may be a touchscreen where a pattern may be drawn by a user, and output component 1002 may be a screen presenting the desired pattern to the user. The two screens may be integrated in one physical device.

Figure 12:
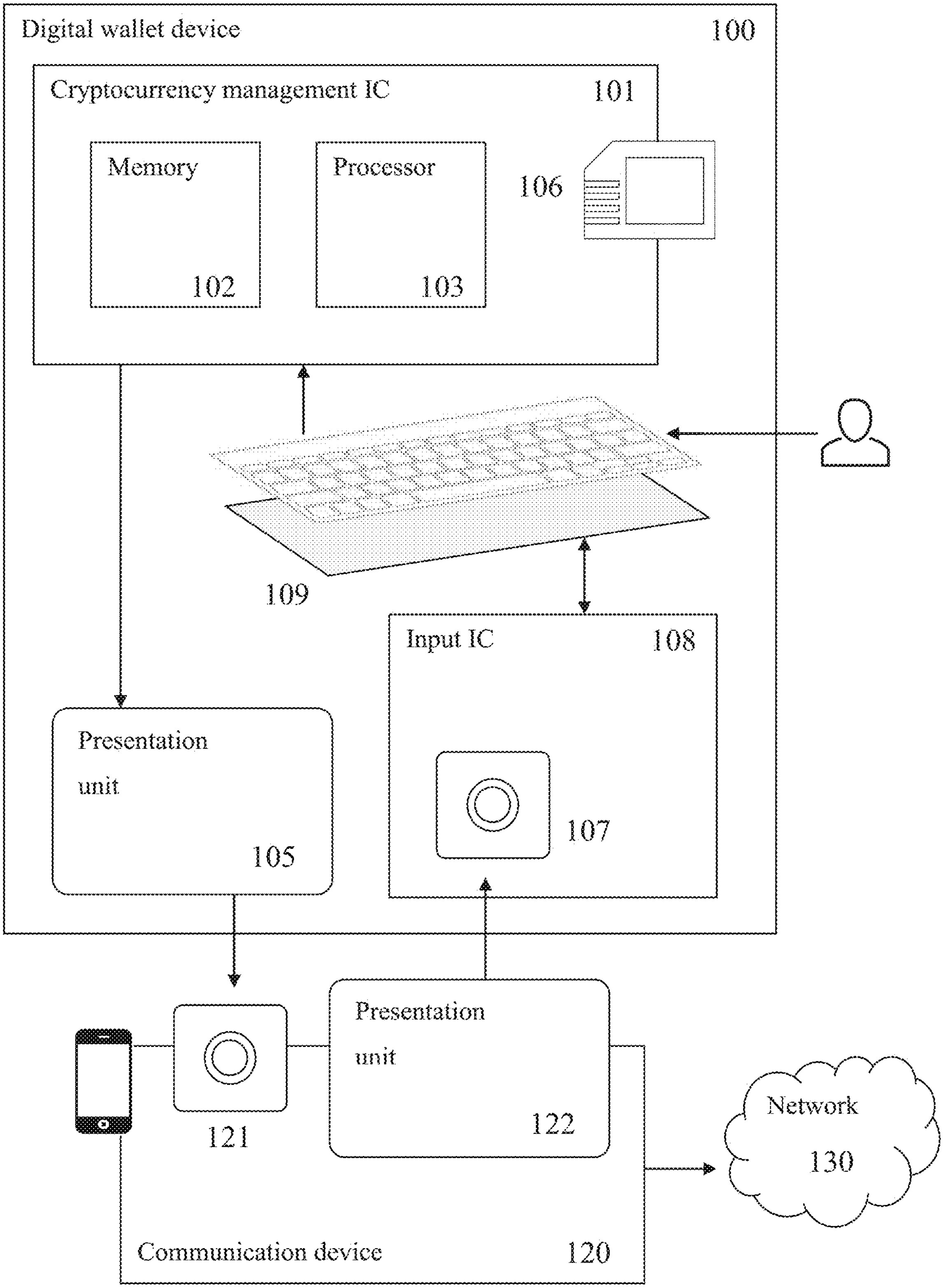
FIG. 12 is a schematic illustration of a digital wallet device having a cryptocurrency management integrated circuit (IC) and an electronically disconnected input IC, according to some embodiments of the present invention.

Reference is now made to FIG. 12, which is a schematic illustration of a digital wallet device having a cryptocurrency management IC and an electronically disconnected input IC, according to some embodiments of the present invention.

Optionally, digital wallet device 100 also includes an input IC 108, mounting a sensor such as imaging device 107.

Input IC 108 is isolated from cryptocurrency management IC 101 and optionally also isolated from any computer interface. Alternatively, input IC 108 receives the data via other unidirectional communication hardware such as a data diode. Both ICs may be integrated in the same physical device, for instance a credit card shaped device. Optionally, input IC 108 is connected to a presentation unit, to present to the user the data acquired by imaging device 107, for example the destination account address for a transaction, so the user may input the data via MMI 104.

Optionally, digital wallet device 100 includes an input system 109 for transferring complex data between electronically disconnected computing devices and having two isolated parts, as described above. Input IC is connected to the output component of input system 109, and cryptocurrency management IC 101 is connected to the input component of input system 109. When a data piece is acquired via a unidirectional communication hardware, for example by imaging device 107, a representation of the data piece is presented by the output component of input system 109 so the user may input the data piece via the input component of input system 109.

Figure 13:
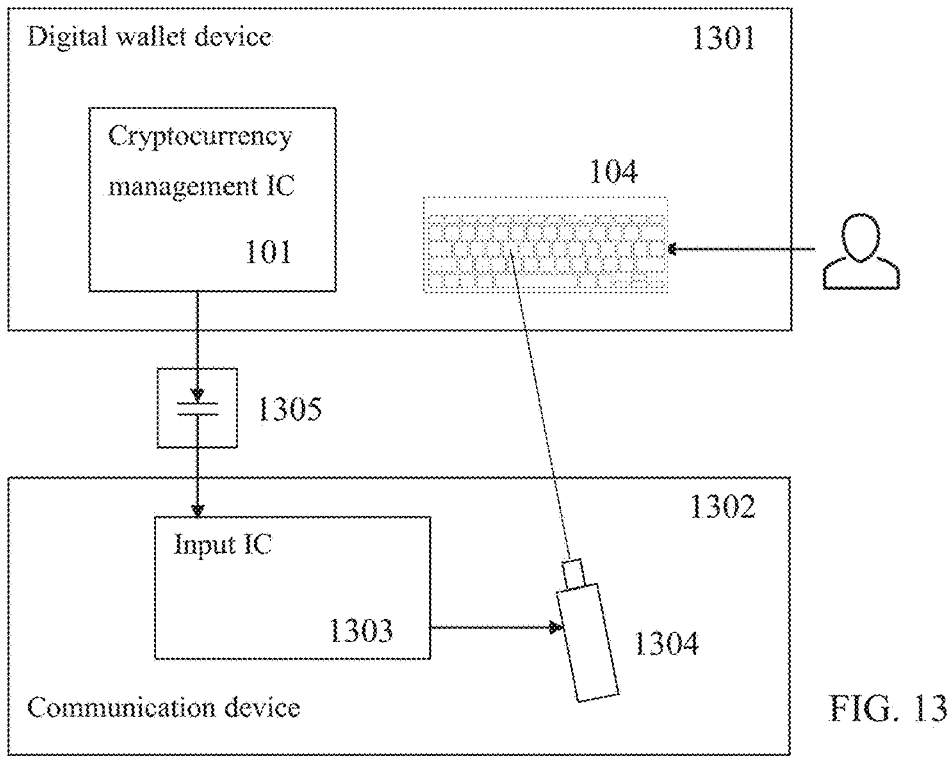
FIG. 13 is a schematic illustration of a digital wallet device having a cryptocurrency management IC and a communication device having an input IC, according to some embodiments of the present invention.

Reference is now made to FIG. 13, which is a schematic illustration of a digital wallet device having a cryptocurrency management IC and a communication device having an input IC, according to some embodiments of the present invention.

In this exemplary configuration, the input to the more secure digital wallet device 1301 (equivalent for example to digital wallet device 100) is based on indication from an input IC 1303 of the less secure device, such as a communication device 1302 which may be connected to the network (equivalent for example to communication device 120) or a less secure digital wallet device (equivalent for example to digital wallet device 802). Input IC 1303 uses a remote indicator 1304, for example a laser device, which points to a keyboard 104 of digital wallet device 1301. Remote indicator 1304 may be part of digital wallet device 1301 (connected physically but not electronically), may be part of communication device 1302, or may be a separate device.

Figure 14:
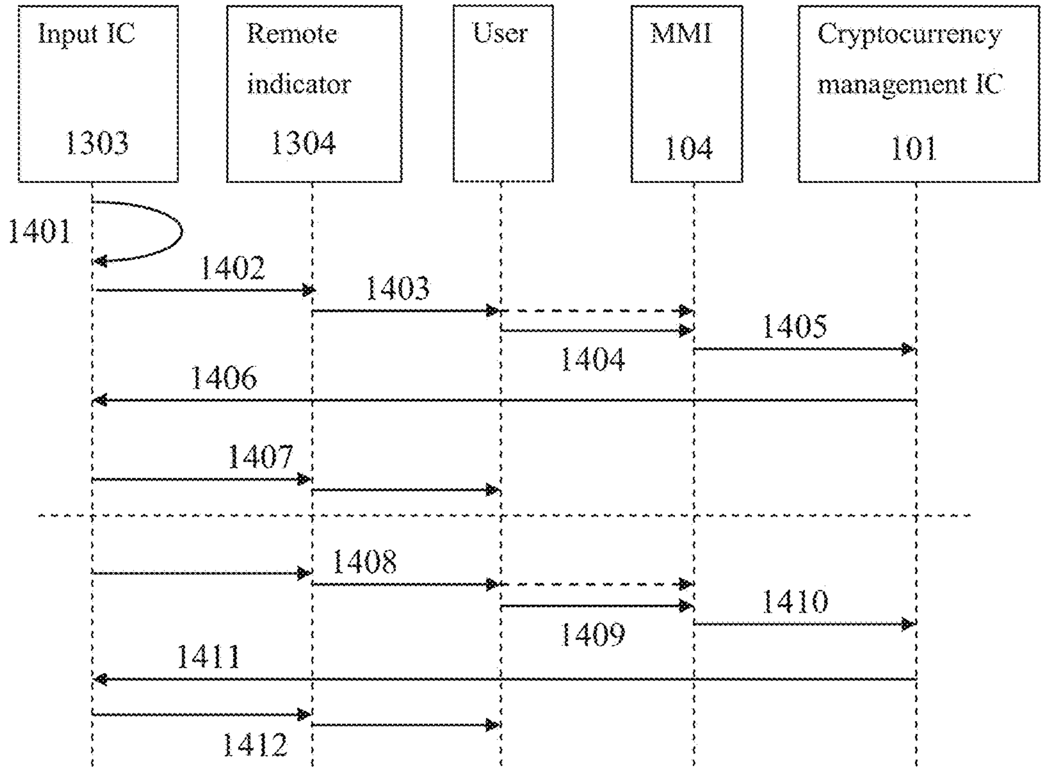
FIG. 14 is a sequence diagram schematically representing a method for using an input system for transferring complex data between electronically disconnected digital wallet devices, according to some embodiments of the present invention.

Reference is also made to FIG. 14, which is a sequence diagram schematically representing a method for using an input system for transferring complex data between electronically disconnected digital wallet devices, according to some embodiments of the present invention.

First, input IC 1303 creates a data string to be entered, for example by the user (1401). Then, input IC 1303 sends a first data piece to remote indicator 1304 (1402). Remote indicator 1304 then indicates to the user of the data piece (1403), for example by pointing a laser beam to a key on MMI 104. Then, the user inputs the data via MMI 104 according to the indication (1404) and the data piece is transferred to cryptocurrency management IC 101 (1405). Then, an indication of the data piece that is inputted by the user (or the currently inputted data string) is sent from cryptocurrency management IC 101 to input IC 1303, via unidirectional communication hardware (1406). For example, the indication of the data piece is sent via a data diode 1305 to input IC 1303. Alternatively, a presentation unit of digital wallet device 1301 presents an indication which is captured by an imaging device of communication device 1302. This way of sending the indication is vulnerable to errors, but is safe against malicious attacks.

Then, when the user inputted the correct data piece, input IC 1303 sends the next data piece to remote indicator 1304 (1407) which indicates to the user of the data piece. Optionally, when the user inputs the wrong data piece, an indication of the error is presented by remote indicator 1304 (1408). The user may then input a delete command for the last data piece (1409), which is transferred to cryptocurrency management IC 101 (1410). Cryptocurrency management IC 101 may then send the currently inputted data string, without the wrong data piece, to input IC 1303 (1411). Input IC 1303 then sends the correct data piece again to remote indicator 1304 which indicates to the user of the data piece (1412).

Optionally, digital wallet device 1301 may deactivate and/or block remote indicator 1304. Optionally, digital wallet device 1301 may present an indication to the user, for example presented on a presentation unit, that remote indicator 1304 should be inactive. This is useful, for example, when sensitive information is inputted using MMI 104, to prevent a hacker that may have gained control over communication device 1302 to guide the user to input the wrong information.

Optionally, a cryptocurrency having a short and/or memorable account address may be used, so it is easier for the user to input the destination account address for a transaction via MMI 104.

In existing cryptocurrency protocols, for example in Ethereum, the account address is the last 160 bits of the hash of the public key related to the account. When fewer of the bits are used, for example 52 bits, there is high probability (after about $2^{26}$=~32 million accounts) that two accounts having the same 52 bits of the hash are created. This is a problem since the blockchain system and the users cannot differentiate between them and funds may be transferred to the wrong account. A possible option to solve this problem is to require new accounts to register in the blockchain by announcing their public key. When an account is created that has the same 52 bits of the hash as an existing account, the new account is rejected and not registered. However, using such a protocol in a digital wallet device that relays on a communication device to broadcast to the blockchain system may not be secure: after an account is created, the public key is transferred to the communication device to announce the public key to the blockchain system. In that step, a communication device that is infected by malicious software or hacked, may try to create a second account having the same 52 bits of the hash as the new account, and announce that second account's public key to the blockchain system. Then, any funds designated to the new account are transferred instead to the second account. A cryptocurrency protocol is required that allows easy and secure use a digital wallet device that relays on a communication device that is not trusted.

Figure 15:
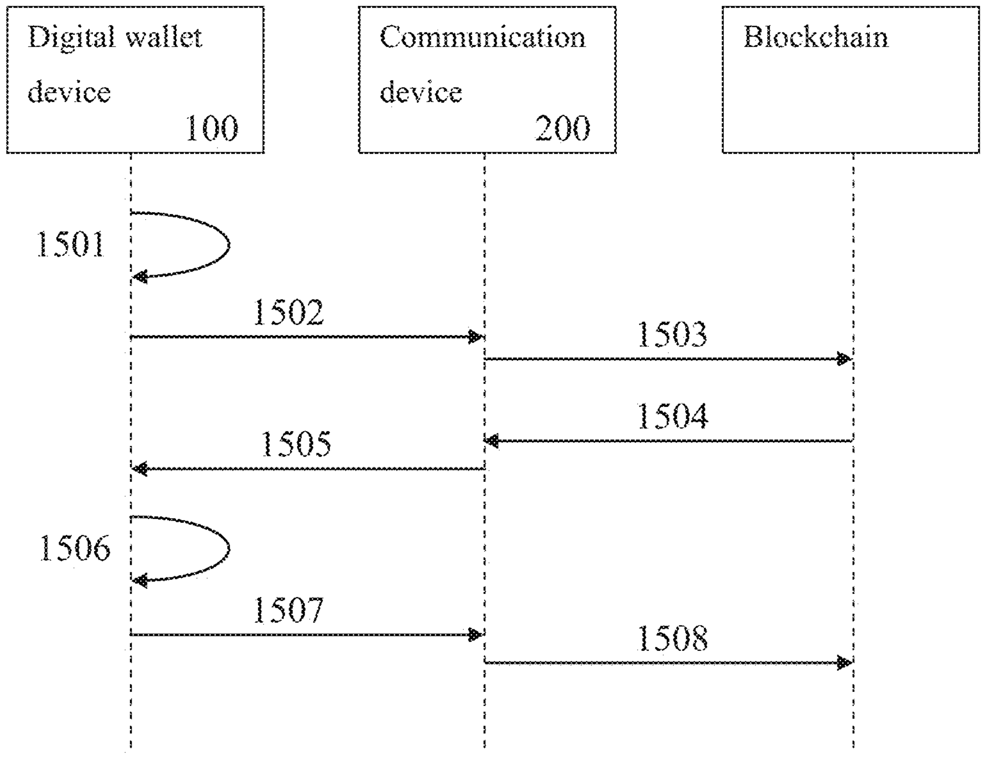
FIG. 15 is a sequence diagram schematically representing a method for creating a cryptocurrency account using a cryptocurrency protocol that provides short public account address by an electronically disconnected device, according to some embodiments of the present invention.

Reference is now made to FIG. 15, which is a sequence diagram schematically representing a method for creating a cryptocurrency account using a cryptocurrency protocol that provides short public account address by an electronically disconnected device, according to some embodiments of the present invention.

First, a private key and a public key for a cryptocurrency account are generated by a device which is electronically disconnected from other digital devices (1501), for example digital wallet device 100. A hash of the public key is presented on presentation unit 105, captured by imaging device 121 (1502) and transmitted by communication device 120 to be added to the blockchain (1503). This hash is different from the hash that is representing the public key in the account address, for example other than sha3-256. A timestamp of the calendric time in which the hash is added to the blockchain is received by communication device 120 (1504) and presented to a user for inputting via MMI 104 to digital wallet device 100 (1505). A standard time for the timestamp may be used, for example Greenwich mean time (GMT). The calendric time is within a unique time slot defined in the protocol. The unique time slot may be, for example, one hour, one day, one week, and/or any other shorter, longer or intermediate time slot. Only after verifying that this unique time slot of adding to the blockchain is passed (1506), the unhashed public key is presented on presentation unit 105, captured by imaging device 121 (1507) and transmitted by communication device 120 to be registered to the blockchain (1508). Now, the public key may be verified against the hash of the public key that was added to the blockchain to make sure it is the same account, and verified to make sure no other existing account has the same bits of the hash as the new account.

Optionally, to make sure that the exact calendric time is known to digital wallet device 100, digital wallet device 100 may include a clock, that may be for example powered by a separate backup power source such as a battery.

The public account address may then include bits representing the timestamp and fewer bits representing the public key, for example by a hash. The public account address may also include bit created by a function operated on the timestamp and/or the public key, for example creating bits representing a hash of both the timestamp and the public key combined. For example, the public account address may include 52 bits, wherein 13 bits represent the timestamp, and 39 bits are a hash of the public key. A timestamp of a date, for example, which is represented by 13 bits would not repeat itself for approximately 22 years. The blockchain includes all the information for the public account address—the timestamp in which the first hash was added to the blockchain, and the public key. The creation of the public account address may also include other steps, for example, performing a hash (for example RIPEMD-160 hashing) on the result of a hash, adding bytes representing version, convert the result from a byte string into a different format such as base58 string and/or any other function or algorithm. Optionally, creating a cryptocurrency account using the protocol, by an online device such as communication device 120, is also possible. In this case, the public account address may include only the first 38 bits of the hash of the public key, and one bit may indicate the method in which the account was created. This method saves the time of waiting for the unique time slot to pass.

Figure 16:
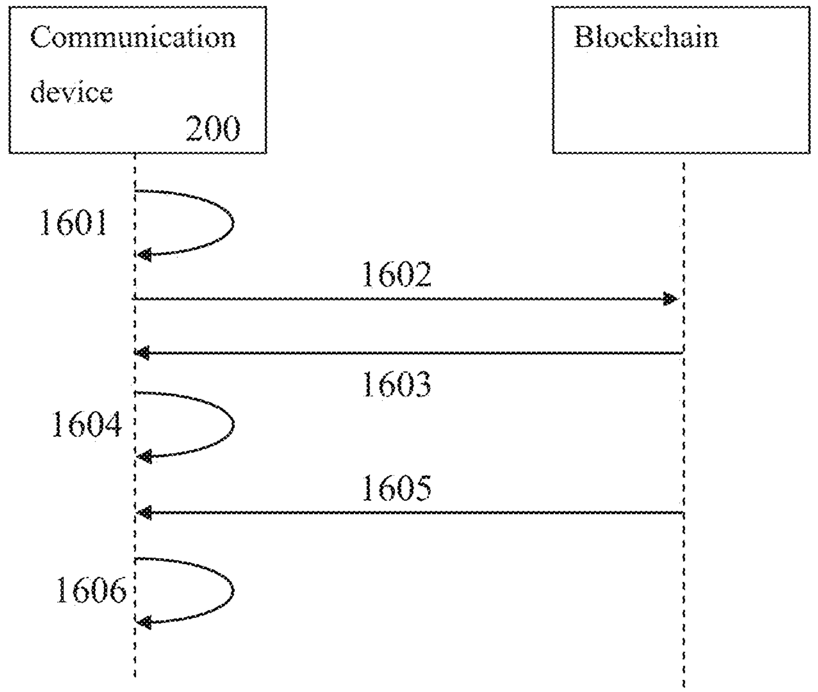
FIG. 16 is a sequence diagram schematically representing a method for creating a cryptocurrency account using a cryptocurrency protocol that provides short public account address by an online device, according to some embodiments of the present invention.

Reference is now made to FIG. 16, which is a sequence diagram schematically representing a method for creating a cryptocurrency account using a cryptocurrency protocol that provides short public account address by an online device, according to some embodiments of the present invention.

An application installed on communication device 120 generates a private key and a public key for a cryptocurrency account (1601). The public key is added to the blockchain (1602) and a confirmation is received (1603). After some time has passed and some blocks were created in the blockchain (1604), the block containing the public key and some following blocks are received (1605) and validated by communication device 120 (1606) to verify that the account is registered. The waiting time may be shorter than the length of the unique time slot, as only a few blocks have to be created.

Optionally, creating a cryptocurrency account using the protocol, without registration in the blockchain (for example when there is no time to wait and/or to avoid transaction fee), is also possible. In this case, the public account address may include the regular 160 last bits of the hash of the public key.

Optionally, each number of bits of the hash of the public account address is represented by a word out of a list, so it is easier for a user to type the words via the MMI and/or remember the public account address. For example, each 13 bits may be represented by a word out of a list of $2^{13}$=8192 words, so a 52 bit public account address is represented by 4 words. A public account address that includes the 160 last bits of the hash of the public key may be represented by 13 words.

Optionally, a transaction to an address which is not registered is not accepted by the blockchain system. This is required in order to prevent a situation where a hacked communication device from falsely confirms to the user that an address is registered in the blockchain while not registering it, and the account cannot receive any cryptocurrency transferred to it, or to prevent a malicious entity from creating an account based on the transaction in order to receive the transferred cryptocurrency. Optionally, a transaction includes an expiration date, after which may no longer be accepted.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant digital wallets will be developed and the scope of the term digital wallet is intended to include all such new technologies a priori.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

In addition, any priority document(s) of this application is/are hereby incorporated herein by reference in its/their entirety.

What is claimed is:

1. A digital wallet device for storing and managing cryptocurrency, comprising:

a cryptocurrency management integrated circuit (IC);

a non-transitory computer readable storage medium mounted on said cryptocurrency management IC and storing a private key of a cryptocurrency and a public key of said cryptocurrency;

an input component comprising a keyboard or a touchscreen;

an output component electronically disconnected from said input component and adapted to receive a data piece indicative of a data string and presenting to a user a representation of said data piece, wherein said representation indicates to said user a specific physical input element to activate on said input component according to a physical structure of said input component;

at least one processor mounted on said cryptocurrency management IC, said at least one processor of said cryptocurrency management IC is configured for:

(i) receiving the data string through the keyboard or the touchscreen, (ii) executing transaction code to create a transaction of said cryptocurrency based on said data string and (iii) signing said transaction using said private key; and a unidirectional communication hardware for sending said transaction to a communication device which is connected to a network for broadcasting said transaction via the network;

wherein said keyboard or touchscreen is receives the data string from the user in response to said representation indicating the specific physical input element to activate on said input component.

2. The digital wallet device of claim 1, wherein said unidirectional communication hardware includes a data diode.

3. The digital wallet device of claim 1, wherein said communication device is a mobile device and said broadcasting is done by a software application installed on said mobile device.

4. The digital wallet device of claim 1, wherein said data string comprising at least one of a destination account address for said transaction and an amount for said transaction.

5. The digital wallet device of claim 1, further comprising:

a removable non-transitory computer readable storage medium storing said transaction code.

6. The digital wallet device of claim 1, wherein said non-transitory computer readable storage medium includes a removable write-only data storage card storing said private key.

7. The digital wallet device of claim 1, further comprising a hardware security module (HSM) storing said private key.

8. The digital wallet device of claim 1, wherein said at least one processor is further executing code to create said private key and said public key.

9. The digital wallet device of claim 1, wherein said private key is further sent via said unidirectional communication hardware.

10. The digital wallet device of claim 1, wherein said at least one processor is further executing code to create a message request based on said data string and to sign said message request using said private key; and said message request is sent by said unidirectional communication hardware to said communication device for transmitting to a smart contract capable of managing cryptocurrency based on said public key.

11. The digital wallet device of claim 1, wherein said at least one processor is further executing code to create a cryptocurrency rule or definition and to sign said rule or definition using said private key.

12. The digital wallet device of claim 1, wherein said at least one processor is further executing code to create policy for a multi-signature scheme and to sign said policy using said private key; and said policy is sent by said unidirectional communication hardware to said communication device for sending to co-signers of said multi-signature scheme.

13. The digital wallet device of claim 12, wherein said multi-signature scheme is based on one of standard blockchain multi-signature and encryption key splitting mechanism.

14. The digital wallet device of claim 1, further comprising a mechanical input component for reading mechanically encoded data, wherein said creation of said transaction is further based on said mechanically encoded data.

* * * * *